United States Patent
Goldsack et al.

(10) Patent No.: US 10,558,500 B2
(45) Date of Patent: Feb. 11, 2020

(54) SCHEDULING HETEROGENOUS PROCESSORS

(71) Applicant: HEWLETT PACKARD ENTERPRISE DEVELOPMENT LP, Houston, TX (US)

(72) Inventors: Patrick Goldsack, Bristol (GB); Brian Quentin Monahan, Bristol (GB); Granville Barnett, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 111 days.

(21) Appl. No.: 15/748,478

(22) PCT Filed: Jul. 27, 2015

(86) PCT No.: PCT/EP2015/067172
§ 371 (c)(1),
(2) Date: Jan. 29, 2018

(87) PCT Pub. No.: WO2017/016590
PCT Pub. Date: Feb. 2, 2017

(65) Prior Publication Data
US 2018/0225150 A1 Aug. 9, 2018

(51) Int. Cl.
*G06F 9/46* (2006.01)
*G06F 9/50* (2006.01)
(Continued)

(52) U.S. Cl.
CPC .............. *G06F 9/5033* (2013.01); *G06F 8/41* (2013.01); *G06F 9/5044* (2013.01); *G06F 9/544* (2013.01)

(58) Field of Classification Search
CPC .............. G06F 8/41; G06F 9/46; G06F 9/5044
See application file for complete search history.

(56) References Cited

U.S. PATENT DOCUMENTS 6,289,369 B1  9/2001  Sundaresan
7,412,701 B1 * 8/2008  Mitra ............... G06F 9/45504
                                                          709/223
(Continued)

FOREIGN PATENT DOCUMENTS

WO    WO-2008127622 A2    10/2008
WO    WO-2012141677 A1    10/2012
(Continued)

OTHER PUBLICATIONS

David Ott, "Optimizing Applications for NUMA," Nov. 2, 2011, pp. 1-3 [online], Retrieved from the Internet on Jun. 24, 2015 at URL: <software.intel.com/en-us/articles/optimizing-applications-for-numa>.

(Continued)

*Primary Examiner* — Camquy Truong
(74) *Attorney, Agent, or Firm* — Hewlett Packard Enterprise Patent Department

(57) ABSTRACT

An example computing device comprises a first processing unit having first capabilities, a second processing unit having second capabilities, and a shared memory accessible by the first processing unit and the second processing unit. The shared memory stores data objects in association with type information indicating the data type of the data objects. The example computing device further comprises an instruction set to, when executed by a processing unit of the computing device, select one of the first processing unit and the second processing unit to perform a computation of a particular type, using data of a particular type stored in the shared memory, wherein the selection is performed based on a predefined affinity of the first processing unit for the particular computation type and/or the particular data type and a predefined affinity of the second processing unit for the particular computation type and/or the particular data type.

15 Claims, 4 Drawing Sheets

(51) Int. Cl.
*G06F 8/41* (2018.01)
*G06F 9/54* (2006.01)

(56) References Cited

U.S. PATENT DOCUMENTS

| | | | |
|---|---|---|---|
| 8,010,822 B2 | 8/2011 | Marshall et al. | |
| 8,762,366 B1 | 6/2014 | Becerra et al. | |
| 2007/0050485 A1* | 3/2007 | Zolfaghari | H04L 12/437 |
| | | | 709/220 |
| 2007/0074109 A1* | 3/2007 | Nagahara | G06F 17/211 |
| | | | 715/210 |
| 2012/0084777 A1 | 4/2012 | Jayamoham | |
| 2012/0102504 A1* | 4/2012 | Iyer | G06Q 10/00 |
| | | | 719/318 |
| 2012/0131588 A1 | 5/2012 | Chung et al. | |
| 2012/0284732 A1 | 11/2012 | Griglock et al. | |
| 2013/0132972 A1 | 5/2013 | Sur et al. | |
| 2014/0380003 A1 | 12/2014 | Hsu et al. | |
| 2015/0040136 A1 | 2/2015 | Matthes et al. | |
| 2017/0153926 A1* | 6/2017 | Callegari | G06F 9/5044 |

FOREIGN PATENT DOCUMENTS

| | | |
|---|---|---|
| WO | WO-2013101024 A1 | 7/2013 |
| WO | WO-2014204437 A2 | 12/2014 |

OTHER PUBLICATIONS

International Search Report and Written Opinion, International Application No. PCT/EP2015/067172, dated May 2, 2016, pp. 1-13, EPO.

\* cited by examiner

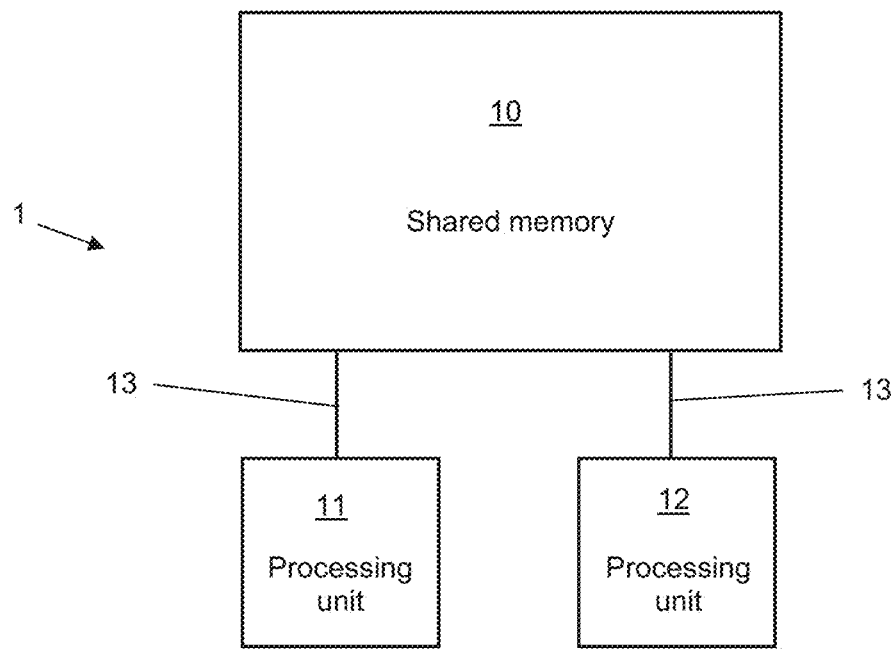

Fig. 1

Select one of the first processing unit and the second processing unit to perform a computation of a particular type, using data of a particular type stored in the shared memory, based on a predefined affinity of the first processing unit for the particular computation type and/or the particular data type and a predefined affinity of the second processing unit for the particular computation type and/or the particular data type

Fig. 2

SCHEDULING HETEROGENOUS PROCESSORS

BACKGROUND

There exist different types of processors, having different capabilities. Certain data types may be best processed on a processor that has specific capabilities, for example images and videos may be best processed on a graphics processing unit (GPU), whilst other data types may be best processed on a digital signal processor (DSP) or a floating-point unit. Some computing devices include two or more different processor types.

BRIEF DESCRIPTION OF THE DRAWINGS

The following detailed description references the drawings, wherein:

FIG. 1 is a block diagram of an example computing device;

FIG. 2 is a flowchart representing an example instruction set of an example computing device;

DETAILED DESCRIPTION

Figure 3:
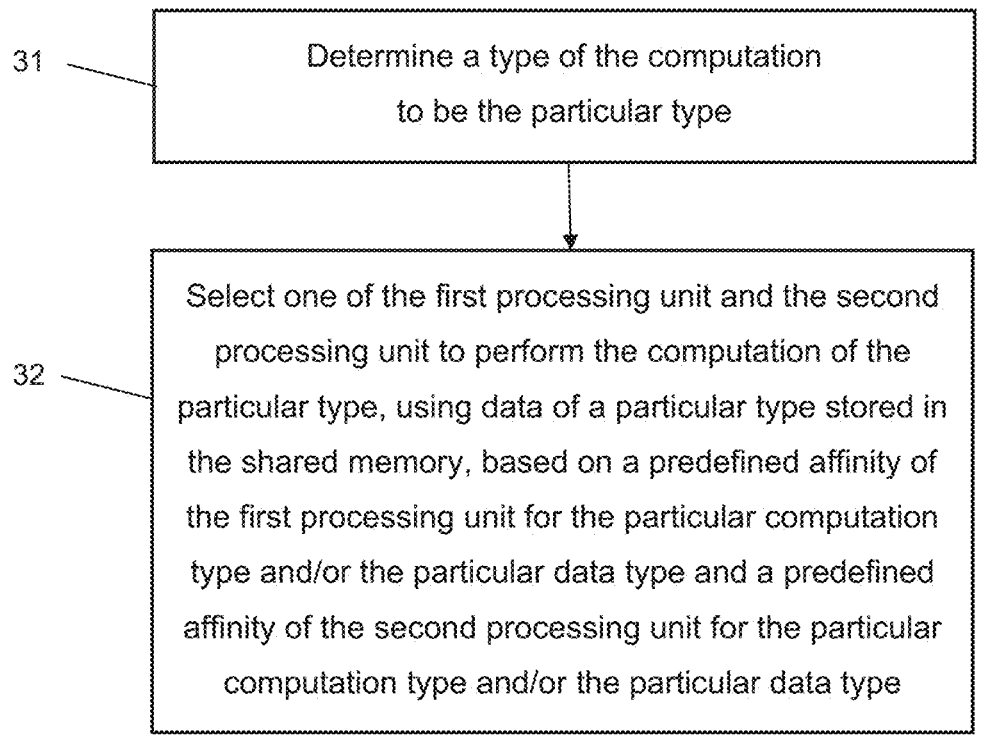
FIG. 3 is a flow chart representing an example instruction set of an example computing device.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

There exist different types of processors, having different capabilities. Certain data types may be best processed on a processor that has specific capabilities, for example images and videos may be best processed on a graphics processing unit (GPU), digital signals may be best processed on a digital signal processor, whilst other data types may be best processed on a floating-point unit. Some computing devices include two or more different processor types. Such computing devices will be referred to hereinafter as "heterogeneous computing devices".

Existing heterogeneous computing devices provide a separate memory for use by each processor comprised in the heterogeneous computing device. Each processor is able to access its associated memory and is not able to access the memories associated with other processors of the heterogeneous computing device.

A technical challenge may exist with the scheduling of tasks on a heterogeneous computing device. There is limited flexibility in how processing tasks can be divided up between the different processors of a heterogeneous computing device in which each processor is associated with an individual memory. This is because, in order for a given processor to be able to perform a given processing task, all of the data required for the given processing task must be stored in the memory associated with the given processor. Consequently, processing tasks are scheduled at a relatively coarse-grained level and it may not be possible to utilize the processors in a resource-efficient manner.

Examples disclosed herein provide technical solutions to these technical challenges. An example computing device provides fine-grained scheduling of processing tasks between heterogeneous processing units of the computing device.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example computing device 1 that can provide fine-grained scheduling of processing tasks between heterogeneous processing units 11, 12 of the computing device 1. The computing device 1 comprises a first processing unit 11 having first capabilities and a second processing unit 12 having second capabilities. The capabilities of the first processing unit may be different from the capabilities of the second processing unit. The first processing unit may comprise a first one of: a central processing unit, CPU, having a first performance/power consumption profile; a graphics processing unit, GPU; a digital signal processor, DSP; a floating-point unit, FPU, a field programmable gate array, FPGA, a composite processing unit (e.g. comprising a CPU plus an accelerator), etc. The second processing unit may comprise a second one of: a CPU having a second performance/power consumption profile; a GPU; a DSP; a FPU, a FPGA, a composite processing unit, etc.

The computing device 1 further comprises a shared memory 10 which is accessible by the first processing unit and the second processing unit. The shared memory may comprise a non-volatile memory. The shared memory stores data objects in association with type information indicating the data type of the data objects. Storing data objects in association with type information may comprise storing data objects which are annotated or otherwise tagged with the type information.

The type information associated with a given data object may comprise information about a type of data comprised in or by the data object. The type information associated with a given data object may comprise information about a type of computation that can be performed using that data object. A type of data may be, e.g., video data, image data, numerical data, signal data, structured data such as a list or graph, etc. A type of computation may be, e.g., a floating point computation; an operation on an image; an operation on a signal, an operation on structured data. For the purposes of the present specification and claims, a "computation" may refer to a part (which may be a small part) of a larger computational task, which need not have identity or utility in its own right. For example, many computational tasks can be decomposed into fine-grained parts (e.g. parameters to functions, or sub-expressions) which relate to different types of data. Each fine-grained part is considered by the present specification and claims to comprise a "computation", and may therefore be individually scheduled to a particular processing unit of the computing device. In some examples, therefore, different parts of a given computational task may be performed by different processing units, possibly in parallel.

Data objects may be stored in the shared memory in a particular layout. The shared memory may comprise a first layout of a given set of data objects and a second layout of the given set of data objects. The first layout may be optimised for access by the first processing unit and the second layout may be optimised for access by the second processing unit. The layout of a given set of data objects in the stored memory may depend on the types of the data objects.

Each data object may be stored in the shared memory at a particular location, wherein a "location" in the shared memory is defined with respect to the topology of the memory hardware. A given processing unit may be able to access some locations faster than other locations. The location of each data object in the shared memory 10 may be based on the speed of access of one or each processing unit 11, 12 to different locations in the shared memory 10.

The first and second processing units 11, 12 may be coupled to the shared memory 10 by communications links 13. The communications links 13 may be high-speed communications links. In some examples the communications links 13 are optical communications links. In some examples the first and second processing units 11, 12 are coupled to the shared memory 10 by a memory fabric. A memory fabric is a technology that unifies the memory of the devices connected to it, such that connected devices can address memory hosted on any of the other devices connected to the same memory fabric. A memory fabric may comprise, for example, an interconnect between a processing unit and memory that is optimized for memory access rather than inter-processing unit communication.

In FIG. 1 and other Figures described herein, different numbers of components, processing units, or entities than depicted may be used. For example, the first and second processing units 11, 12 may be comprised in a plurality of processing units of the computing device 1, in which case the shared memory 10 may be accessible by each of the plurality of processing units.

The computing device 1 further comprises an instruction set for execution by a processing unit of the computing device. FIG. 2 shows an example instruction set 20 of a computing device, e.g. the computing device 1. The instruction set 20 is to, when executed by a processing unit of the computing device, select one of the first processing unit and the second processing unit to perform a computation of a particular type, using data of a particular type stored in the shared memory. The type of the computation may be any of the computation types listed above. The type of the data may be any of the data types listed above.

A computation may comprise, e.g., a callable unit; a part of a callable unit; a loop of a callable unit; a program; an operation, an expression, a statement, a function, a subroutine, etc. Since, in the examples, each processing unit 11, 12 can access the data objects in the shared memory 10, it is possible to divide up processing tasks (i.e. into "computations") between the different processing units at a fine-grained level. Each computation may therefore comprise a small part of a processing task. Each processing unit 11, 12 can simultaneously perform computations (e.g. the processing units 11, 12 may operate in parallel). The examples therefore enable fine-grained parallel processing of tasks.

The instruction set is further to, when executed by a processing unit of the computing device, perform the selection based on a predefined affinity of the first processing unit for the particular computation type and/or the particular data type and a predefined affinity of the second processing unit for the particular computation type and/or the particular data type. A predefined affinity may comprise, for example, an indication of the performance level of a processing unit when processing data of a given type, or when performing computations of a given type. A predefined affinity may comprise, for example, an indication of a suitability of a processing unit for processing data of a given type, or for performing computations of a given type. An indication comprised in a predefined affinity can be, e.g. a numerical value, a percentage, a ratio, a value-related word (such as "high", "low", "medium", "good", "poor", "average", etc.) an affinity measure, an affinity metric, a term from a predefined set of ordered terms, etc.

The predefined affinity of the first processing unit may be defined based on the capabilities of the first processing unit to process data of the particular type. The predefined affinity of the first processing unit may be defined based on the capabilities of the first processing unit to perform computations of the given type. The predefined affinity of the second processing unit may be defined based on the capabilities of the second processing unit to process data of the particular type. The predefined affinity of the second processing unit may be defined based on the capabilities of the second processing unit to perform computations of the given type.

In a particular example the first processing unit is a GPU, the second processing unit is a DSP, the type of the computation is an operation on an image, and the type of the data is image data. CPUs are better suited for performing operations on images, using image data, than are DSPs. The predefined affinity of the first processing unit (the GPU) for operations on images and for processing image data is defined to be higher than the predefined affinity of the second processing unit (the DSP) for operations on images and for processing image data. The predefined affinity of the first processing unit for the particular computation type, and/or for the particular data type, is therefore defined to be higher than the predefined affinity of the second processing unit for the particular computation type, and/or for the particular data type.

The instruction set may be arranged such that selecting one of the first processing unit and the second processing unit comprises comparing the predefined affinity of the first processing unit with the predefined affinity of the second processing unit and selecting a one of the first processing unit and the second processing unit which has a greater predefined affinity. The computing device may comprise one or more rules (e.g. stored in the shared memory, or another memory) for use in comparing a pair of affinities to determine which is greater. For example, if the predefined affinities comprise numerical values, the computing device may comprise a rule stating that a predefined affinity comprising a higher numerical value is greater than a predefined affinity comprising a lower numerical value. The computing device may comprise one or more rules which define a hierarchy of possible predefined affinities.

The instruction set may be arranged such that selecting one of the first processing unit and the second processing unit comprises determining a current resource utilisation of the first processing unit and a current resource utilisation of the second processing unit, and performing the selection based additionally on the determined current resource utilisations. Determining a current resource utilisation of a processing unit may comprise determining a current load of a processing unit. In some examples the instruction set is arranged such that selecting one of the first processing unit and the second processing unit comprises selecting a processing unit having a predefined affinity above a predefined minimum affinity threshold and a lowest current resource utilisation to perform the computation. Such examples can ensure that the resources of the computing device are used efficiently. Some examples can ensure that the resources of the computing device are used as efficiently as possible to achieve a particular overall system goal, such as minimizing time to complete, or minimizing energy consumption. In some examples the instruction set is to, when executed by a processing unit of the computing device, determine a type of the computation. One such example is shown in FIG. 3. The instruction set of FIG. 3 comprises a first block 31, in which the instruction set, when executed by a processing unit, causes the computing device to determine a type of the computation to be the particular type. The determination of a type of the computation may be based on a signature of the computation. A signature of a computation may indicate the type of data that is used as an input by the computation. A signature of a computation may indicate the type of data that is output as a result of the computation. A signature of a computation may indicate a type of data that is referenced within the computation.

In a second block 32, the instruction set, when executed by a processing unit, causes the computing device to select one of the first processing unit and the second processing unit to perform the computation of the particular type, e.g. in the manner described above in relation to FIG. 2.

In some examples each predefined affinity comprises an absolute value, which is defined based on the capabilities of the processing unit to which the predefined affinity relates, and does not take into account the capabilities of other processing units of the computing device. In some examples the predefined affinity of a given processing unit is defined based on the capabilities of that processing unit and on the capabilities of other processing units comprised in the computing device. In some examples the predefined affinity of a given processing unit comprised in the computing device is defined based on the capabilities of that processing unit to process data of the particular type or to perform computations of the given type relative to the capabilities of each other processing unit comprised in the computing device to process data of the particular type or to perform computations of the given type. For example, a predefined affinity of a given processing unit may comprise a measure of how much "better" that processing unit is for processing a given computation type or data type than a different processor of the computing device.

A predefined affinity of a processing unit for a given computation type or data type may comprise an indication of how quickly that processing unit is able to perform computations of the given type, or to process the given data type. A predefined affinity of a processing unit for a given computation type or data type may comprise an indication of how power efficient that processing unit is when performing computations of the given type, or processing the given data type. An indication of how quickly a processing unit is able to perform computations of a given type/process data of a given type may comprise a measure of how much more (or less) quickly that processing unit is able to perform such computations/process such data than another processing unit of the computing device. An indication of how power efficient a processing unit is when performing computations of a given type/processing data of a given type may comprise a measure of how much more (or less) power efficient that processing unit is when performing such computations/processing such data than another processing unit of the computing device.

Predefined affinities of processing units comprised in a computing device may be stored in an affinity table in a shared memory of the computing device. In the example of FIG. 1, the predefined affinity of the first processing unit 11 and the predefined affinity of the second processing unit 12 may be stored in an affinity table in the shared memory 10. In some examples a computing device may have more than one affinity table. For example, a shared memory of a computing device may comprise a first affinity table comprising predefined affinities of processing units of the computing device for particular data types and a second affinity table comprising predefined affinities of processing units of the computing device for particular computation types.

In some examples the affinity table comprises a set of affinity measures relating one of the first and second processing units to a particular data type or to a particular computation type. In such examples the set of affinity measures may comprise an affinity measure for each possible processing unit-data type pair and/or for each possible processing unit-computation type pair. In some examples each affinity measure for a given processing unit comprises a set of relative affinity values, where each relative affinity value represents a difference in affinity, for a given computation type or data type, between the given processing unit and another processing unit comprised in the computing device. The set of relative affinity values may comprises a relative affinity value for each possible pairing of the given processing unit with another processing unit.

TABLE 1 is an example affinity table of a computing device comprising a GPU, a DSP and a CPU.

TABLE 1

An example affinity table of an example computing device

| Data type | GPU affinity | DSP affinity | CPU affinity |
| --- | --- | --- | --- |
| Image data | 100 | 10 | 50 |
| Video data | 100 | 10 | 50 |
| Floating point data | 10 | 10 | 70 |
| Signal data | 10 | 100 | 50 |
| List data | 10 | 0 | 90 |

In this example the affinities comprise absolute values, indicating (on a scale of 0 to 100) a performance level of each processing unit when processing data of various types.

The predefined affinities may be used to determine the manner in which a given data object is stored in the shared memory 10. In some examples the layout of the data objects in the shared memory 10 is based on the types of the data objects and on the predefined affinities of the processing units. For example, data objects of a given data type for which the first processing unit 11 has a relatively greater affinity and for which the second processing unit 12 has a relatively lesser affinity may be stored in a layout which is optimised for access by the first processing unit 11. It is expected in such examples that the data objects of the given data type will be frequently used by the first processing unit 11 and infrequently (or never) used by the second processing unit 12. Optimising the layout of the data objects of the given type for the first processing unit can therefore improve the performance of example computing devices having this feature.

In some examples the predefined affinity of the first processing unit 11 for a given data type or a computation type which uses the given data type may be the same as or similar to the predefined affinity of the second processing unit 12 for the given data type or a computation type which uses the given data type. In such examples the frequency with which the first processing unit 11 accesses data objects of the given type may be the same as or similar to the frequency with which the second processing unit 12 accesses data objects of the given type. Therefore, in some examples the shared memory 10 comprises a first layout of a first set of data objects and a second layout of the first set of data objects, where the first layout is optimised for access by the first processing unit and the second layout is optimised for access by the second processing unit. In some examples the first set of data objects comprises data objects of a given data type The predefined affinity of the first processing unit for the given data type and/or a given computation type which uses the given data type may be above a predefined minimum affinity threshold, and the predefined affinity of the second processing unit for the given data type and/or a given computation type which uses the given data type may also be above the predefined minimum affinity threshold. Examples having the feature of storing a set of data objects in multiple layouts can achieve improved performance, which can outweigh the associated additional storage overhead.

The predefined affinities may be used to determine the location, with respect to the topology of the memory hardware, at which a given data object is stored in the shared memory 10. In some examples the location of each data object in the shared memory 10 is based on the types of the data objects and on the predefined affinities of the processing units. In some examples the location of each data object in the shared memory 10 is based on the speed of access of each processing unit to each different location in the shared memory.

For example, data objects of a given data type for which the first processing unit 11 has a relatively greater affinity and for which the second processing unit 12 has a relatively lesser affinity may be stored in locations which can be more quickly accessed by the first processing unit 11 than by the second processing unit 12. It is expected in such examples that the data objects of the given data type will be frequently used by the first processing unit 11 and infrequently (or never) used by the second processing unit 12. Location of the data objects of the given type such that they can be quickly accessed by the first processing unit can therefore improve the performance of example computing devices having this feature.

In some examples the predefined affinity of the first processing unit 11 for a given data type or a computation type which uses the given data type may be the same as or similar to the predefined affinity of the second processing unit 12 for the given data type or a computation type which uses the given data type. In such examples the frequency with which the first processing unit 11 accesses data objects of the given type may be the same as or similar to the frequency with which the second processing unit 12 accesses data objects of the given type. Therefore, in some examples data objects of the given data type may be stored in locations which can be quickly accessed by both the first processing unit 11 and the second processing unit 12.

Figure 4:
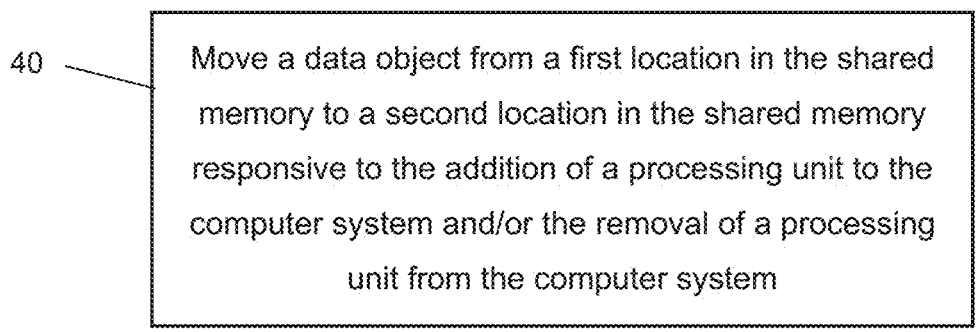
FIG. 4 is a flow chart representing an example instruction set of an example computing device.

In some examples the computing device 1 further comprises a memory optimisation instruction set for execution by a processing unit of the computing device. FIG. 4 shows an example memory optimisation instruction set 40 of a computing device, e.g. the computing device 1. The instruction set 40 is to, when executed by a processing unit of the computing device, move a data object from a first location in the shared memory to a second location in the shared memory responsive to the addition of a processing unit to the computing device and/or the removal of a processing unit from the computing device.

For example, a computing device may comprise a DSP and a CPU, as well as a memory optimisation instruction set (e.g. the instruction set 40). The CPU has a greater affinity for image data than the DSP, so data objects comprising image data are stored in a shared memory of the computing device at locations which can be quickly accessed by the CPU. A GPU is added to the computing device, which has a greater affinity for image data than the CPU. However; the GPU cannot quickly access some of the memory locations at which image data objects are stored. In response to the addition of the GPU, a processing unit of the computing device executes the memory optimisation instruction set, and this causes the computing device to move the image data objects stored at locations which cannot quickly be accessed by the GPU to locations which can be quickly accessed by the GPU. If the GPU was subsequently removed, the memory optimisation instruction set, when executed by a processing unit of the computing devices, would in response to the removal, cause the computing device to move the image data objects back to their original locations (or other locations able to be quickly accessed by the CPU).

Figure 5A:
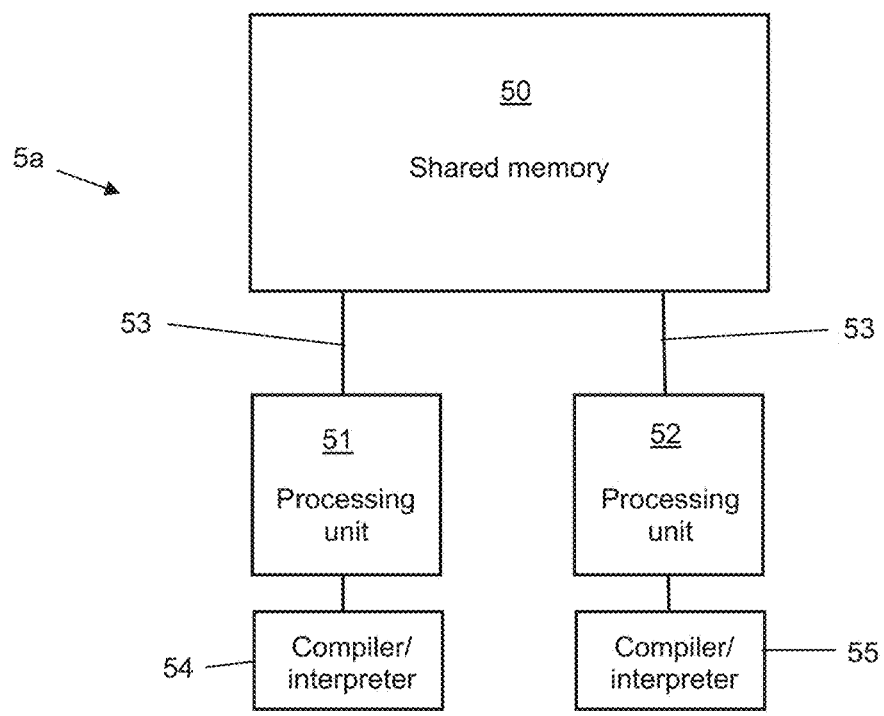
FIG. 5a is a block diagram of an example computing device.
Figure 5B:
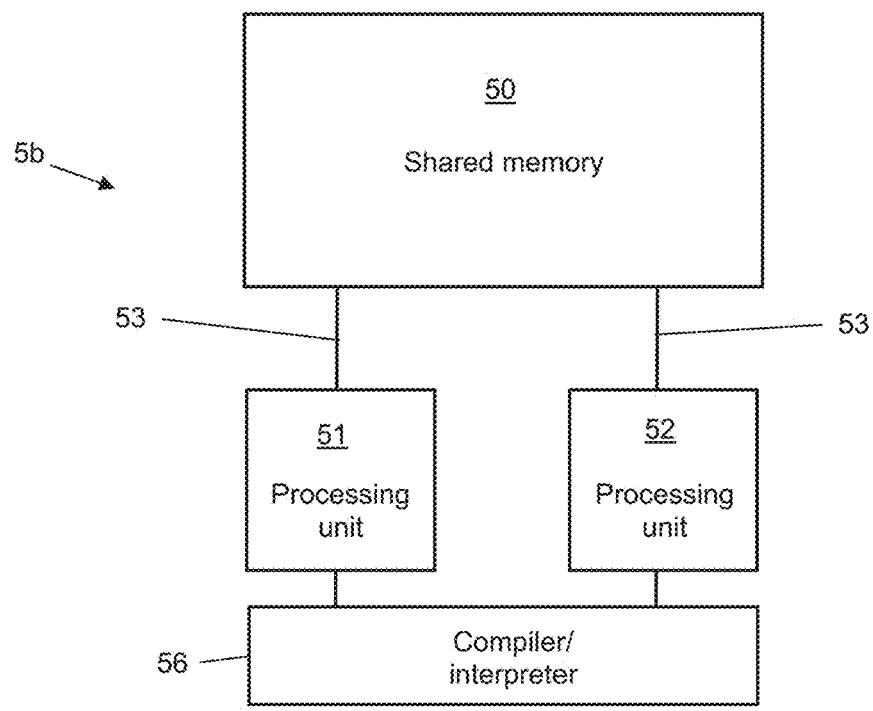
FIG. 5b is a block diagram of an example computing device.

In some examples a computing device further comprises a compiler or an interpreter. FIG. 5a and FIG. 5b show two such examples.

In FIG. 5a, a computing device 5a comprises a first processing unit 51 and a second processing unit 52, each of which is able to access a shared memory 50 by means of a communications link 53. The first processing unit 51 is associated with a first compiler or interpreter 54 and the second processing unit 52 is associated with a second compiler or interpreter 55. The computing device 5a also comprises an instruction set, e.g. the instruction set 20 of FIG. 2. The first compiler or interpreter 54 is to transform the computation into first code if, when executed by a processing unit of the computing device 5a, the instruction set 20 causes the first processing unit 51 to be selected to perform the computation, and to transform the computation into second code if the second processing unit is selected to perform the computation. The first compiler or interpreter 54 and/or the second compiler or interpreter 55 may be a just-in-time compiler. The first code may be optimised for the first processing unit 51 and the second code may be optimised for the second processing unit 52. The first code and/or the second code may be compiled code, e.g. cached from a previous operation of a just-in-time compiler.

FIG. 5b shows a computing device 5b, which is the same as the computing device 5a except that the first processing unit 51 and the second processing unit 52 are both associated with a single compiler or interpreter 56. The single compiler or interpreter 56 is to transform the computation into first code if, when executed by a processing unit of the computing device 5*b*, the instruction set 20 causes the first processing unit 51 to be selected to perform the computation, and to transform the computation into second code if the second processing unit is selected to perform the computation. The compiler or interpreter 56 may be a just-in-time compiler. The first code may be optimised for the first processing unit 51 and the second code may be optimised for the second processing unit 52. The first code and/or the second code may be compiled code, e.g. cached from a previous operation of a just-in-time compiler.

Figure 6:
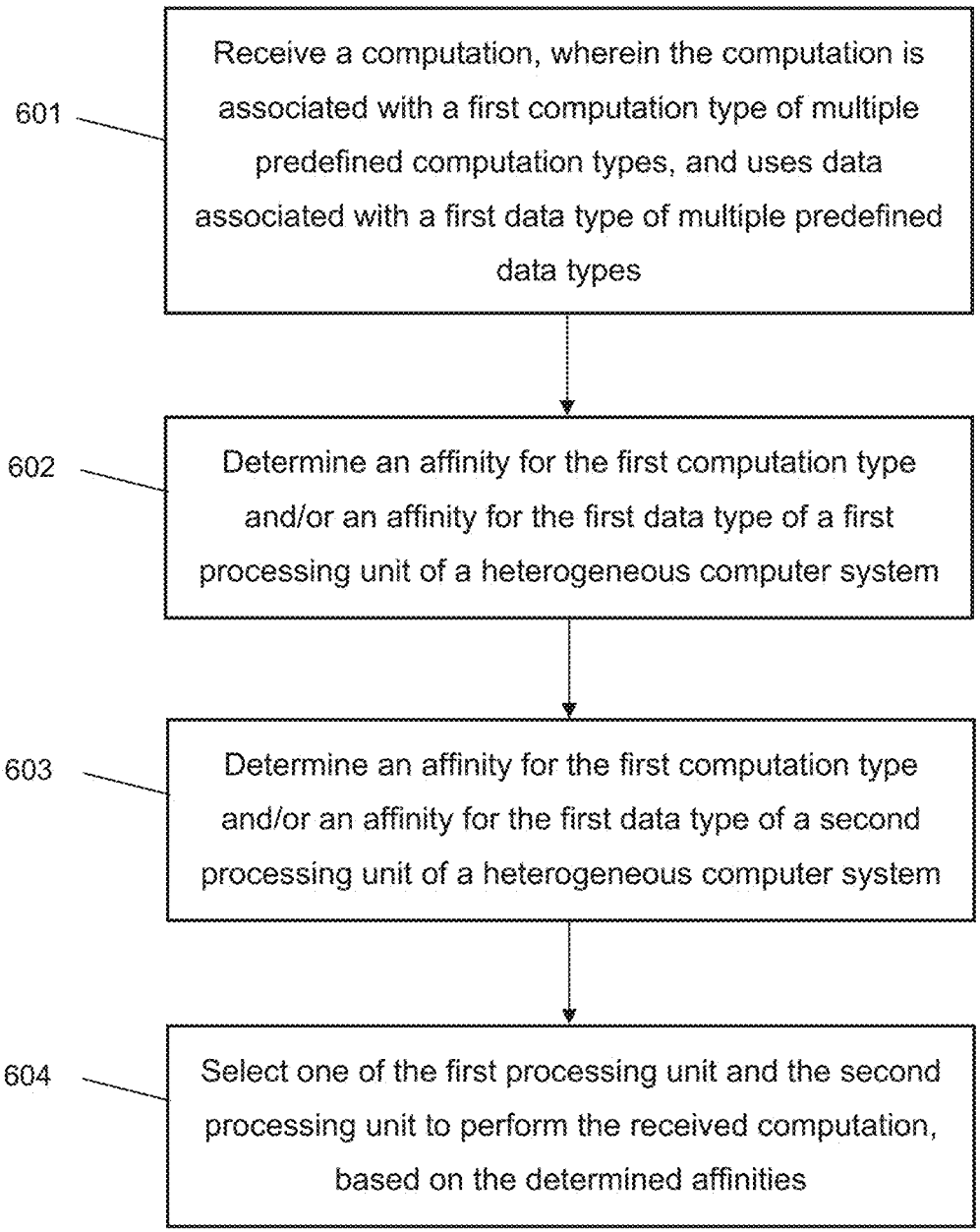
FIG. 6 is a flowchart of an example method for execution by an example computing device.

FIG. 6 is a flowchart of an example method for execution by an example computing device, e.g. for allocating a computation to a processing unit of a heterogeneous computing device. Although execution of the methods described below are with reference to the computing device of FIG. 1, other suitable devices for execution of this method may be employed to practice the present techniques. The flow diagram described in FIG. 6 and other figures may be implemented in the form of executable instructions (e.g. the instruction set 20 of FIG. 2) stored on a machine-readable storage medium, such as the shared storage, by one or several components described herein, and/or in the form of electronic circuitry.

The various processing blocks and/or data flows depicted in FIG. 6 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the operations depicted in the flow diagram as illustrated (and described in greater detail below) are meant be an example and, as such, should not be viewed as limiting.

In block 601, a computation is received, e.g. by a processing unit of a heterogeneous computing system such as the computing device 1. The processing unit which receives the computation may be the first processing unit 11, the second processing unit 12, or another processing unit of the heterogeneous computer system. In some examples the heterogeneous computer system may not comprise a central scheduling entity or process, in which case the first processing unit 11 and the second processing unit 12 may each retrieve their own next tasks from memory. In such examples blocks 601-604 may be performed in parallel by the first processing unit 11 and the second processing unit 12. The computation may have any of the forms described above in relation to the operation of the computing device 1. The computation is associated with a first computation type of multiple predefined computation types. The multiple predefined computation types may comprise any or all of the computation types described above in relation to the operation of the computing device 1. The computation may use data associated with a first data type of multiple predefined data types. The multiple predefined data types may comprise any or all of the data types described above in relation to the operation of the computing device 1.

In block 602 an affinity of a first processing unit of the heterogeneous computer system for the first computation type and/or an affinity of the first processing unit of the heterogeneous computer system for the first data type is determined, e.g. by the processing unit which received the computation. The determination of the affinity may be performed in any of the ways described above in relation to the operation of the computing device 1.

In block 603 an affinity of a second processing unit of the heterogeneous computer system for the first computation type and/or an affinity of the second processing unit of the heterogeneous computer system for the first data type is determined, e.g. by the processing unit which received the computation. The determination of the affinity may be performed in any of the ways described above in relation to the operation of the computing device 1.

In block 604 one of the first processing unit and the second processing unit is selected (e.g. by the processing unit which received the computation) to perform the received computation, based on the determined affinities. The selection may be performed in any of the ways described above in relation to the operation of the computing device 1.

Blocks 601-604 may be repeated as and when further computations are received. In some examples multiple computations may be received simultaneously or near simultaneously, e.g. examples in which each computation comprises a part of a larger processing task. In some such examples the method of FIG. 6 may be performed simultaneously in respect of each of the multiple computations.

Examples in the present disclosure can be provided as methods, systems or machine readable instructions. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules or engines of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operation steps to produce computer-implemented processing, thus the instructions executed on the computer or other programmable devices provide a step for realizing functions specified by flow(s) in the flow charts and/or block(s) in the block diagrams.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computing device comprising: a first processing unit having first capabilities; a second processing unit having second capabilities; a shared memory accessible by the first processing unit and the second processing unit, wherein the shared memory stores data objects in association with type information indicating the data type of the data objects;
   an instruction set to, when executed by a processing unit of the computing device:
   select one of the first processing unit and the second processing unit to perform a computation of a particular type, using data of a particular type stored in the shared memory, wherein the selection is performed based on a predefined affinity of the first processing unit for the particular computation type and/or the particular data type and a predefined affinity of the second processing unit for the particular computation type and/or the particular data type,
   wherein a location, with respect to a topology of the memory hardware, of each data object in the shared memory is based on the types of the data objects, on the predefined affinities of the processing units, and on the speed of access of each processing unit to each different location in the shared memory.

2. A computing device in accordance with claim 1, wherein the predefined affinity of the first processing unit is defined based on the capabilities of the first processing unit to process data of the particular type or to perform computations of the given type and the predefined affinity of the second processing unit is defined based on the capabilities of the second processing unit to process data of the particular type or to perform computations of the given type.

3. A computing device in accordance with claim 2, wherein the predefined affinity of a given processing unit comprised in the computing device is defined based on the capabilities of that processing unit to process data of the particular type or to perform computations of the given type relative to the capabilities of each other processing unit comprised in the computing device to process data of the particular type or to perform computations of the given type.

4. A computing device in accordance with claim 1, wherein the predefined affinity of the first processing unit and the predefined affinity of the second processing unit are stored in an affinity table in the shared memory, wherein the affinity table comprises a set of affinity measures relating one of the first and second processing units to a particular data type or to a particular computation type, and wherein the set of affinity measures comprises an affinity measure for each possible processing unit-data type pair and/or for each possible processing unit-computation type pair.

5. A computing device in accordance with claim 4, wherein each affinity measure for a given processing unit comprises a set of relative affinity values, each relative affinity value representing a difference in affinity, for a given computation type or data type, between the given processing unit and another processing unit comprised in the computing device, and wherein the set of relative affinity values comprises a relative affinity value for each possible pairing of the given processing unit with another processing unit.

6. A computing device in accordance with claim 1, wherein selecting one of the first processing unit and the second processing unit comprises comparing the predefined affinity of the first processing unit with the predefined affinity of the second processing unit and selecting a one of the first processing unit and the second processing unit which has a greater predefined affinity.

7. A computing device in accordance with claim 1, wherein the layout of the data objects in the shared memory is based on the types of the data objects and on the predefined affinities of the processing units.

8. A computing device in accordance with claim 7, wherein the shared memory comprises a first layout of a first set of data objects and a second layout of the first set of data objects, wherein the first layout is optimised for access by the first processing unit and the second layout is optimised for access by the second processing unit.

9. A computing device in accordance with claim 8, wherein the first set of data objects comprises data objects of a given type, and wherein the predefined affinity of the first processing unit for the given data type and/or a given computation type which uses the given data type is above a predefined minimum affinity threshold, and the predefined affinity of the second processing unit for the given data type and/or a given computation type which uses the given data type is above the predefined minimum affinity threshold.

10. A computing device in accordance with claim 1, further comprising a compiler or an interpreter, wherein the compiler or interpreter is to transform the computation into first code if the first processing unit is selected to perform the computation, and to transform the computation into second code if the second processing unit is selected to perform the computation.

11. A computing device comprising:
    a first processing unit having first capabilities;
    a second processing unit having second capabilities;
    a shared memory accessible by the first processing unit and the second processing unit, wherein the shared memory stores data objects in association with type information indicating the data type of the data objects;
    an instruction set to, when executed by a processing unit of the computing device:
    select one of the first processing unit and the second processing unit to perform a computation of a particular type, using data of a particular type stored in the shared memory, wherein the selection is performed based on a predefined affinity of the first processing unit for the particular computation type and/or the particular data type and a predefined affinity of the second processing unit for the particular computation type and/or the particular data type,
    wherein selecting one of the first processing unit and the second processing unit comprises determining a current resource utilisation of the first processing unit and a current resource utilisation of the second processing unit, and performing the selection based additionally on the determined current resource utilisations, and, wherein selecting one of the first processing unit and the second processing unit comprises selecting a processing unit having a predefined affinity above a predefined minimum affinity threshold and a lowest current resource utilisation to perform the computation.

12. A computing device in accordance with claim 11, further comprising a compiler or an interpreter, wherein the compiler or interpreter is to transform the computation into first code if the first processing unit is selected to perform the computation, and to transform the computation into second code if the second processing unit is selected to perform the computation.

13. A computing device comprising:
a first processing unit having first capabilities;
a second processing unit having second capabilities;
a shared memory accessible by the first processing unit and the second processing unit, wherein the shared memory stores data objects in association with type information indicating the data type of the data objects;
an instruction set to, when executed by a processing unit of the computing device:
select one of the first processing unit and the second processing unit to perform a computation of a particular type, using data of a particular type stored in the shared memory, wherein the selection is performed based on a predefined affinity of the first processing unit for the particular computation type and/or the particular data type and a predefined affinity of the second processing unit for the particular computation type and/or the particular data type, and
move a data object from a first location in the shared memory to a second location in the shared memory responsive to the addition of a processing unit to the computing device and/or the removal of a processing unit from the computing device.

14. A computing device in accordance with claim 13, further comprising a compiler or an interpreter, wherein the compiler or interpreter is to transform the computation into first code if the first processing unit is selected to perform the computation, and to transform the computation into second code if the second processing unit is selected to perform the computation.

15. A computing device in accordance with claim 13, wherein the location, with respect to the topology of the memory hardware, of each data object in the shared memory is based on the types of the data objects, on the predefined affinities of the processing units, and on the speed of access of each processing unit to each different location in the shared memory.

* * * * *